United States Patent
Shim et al.

(10) Patent No.: US 11,282,356 B2
(45) Date of Patent: Mar. 22, 2022

(54) ELECTRONIC DEVICE AND METHOD FOR OUTPUTTING ALERT, AND SYSTEM COMPRISING LOCKING DEVICE COUPLED TO ELECTRONIC DEVICE

(71) Applicant: Samsung Electronics Co., Ltd., Gyeonggi-do (KR)

(72) Inventors: Choongsun Shim, Gyeonggi-do (KR); Cheolyoon Chung, Gyeonggi-do (KR); Hyunseok Park, Gyeonggi-do (KR); Kyungwoo Lim, Gyeonggi-do (KR); Sangmoo Hwangbo, Gyeonggi-do (KR); Hyunseok Seo, Gyeonggi-do (KR); Kyungmin Lee, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/965,064

(22) PCT Filed: Jan. 16, 2019

(86) PCT No.: PCT/KR2019/000655
§ 371 (c)(1),
(2) Date: Jul. 27, 2020

(87) PCT Pub. No.: WO2019/164131
PCT Pub. Date: Aug. 29, 2019

(65) Prior Publication Data
US 2021/0110687 A1    Apr. 15, 2021

(30) Foreign Application Priority Data

Feb. 23, 2018    (KR) .................. 10-2018-0022238

(51) Int. Cl.
*G08B 13/14*    (2006.01)
*G08B 13/22*    (2006.01)
(Continued)

(52) U.S. Cl.
CPC ............. *G08B 13/22* (2013.01); *G06F 1/266* (2013.01); *G06F 21/88* (2013.01); *G08B 7/06* (2013.01);
(Continued)

(58) Field of Classification Search
CPC ........ E05B 41/00; E05B 47/00; E05B 45/005; E05B 39/00; E05B 43/00; E05B 73/0017;
(Continued)

(56) References Cited

U.S. PATENT DOCUMENTS

| | | | | | |
|---|---|---|---|---|---|
| 6,078,265 | A | * | 6/2000 | Bonder | G07C 9/00563 340/5.23 |
| 8,294,578 | B2 | * | 10/2012 | Chang | G06F 21/88 340/568.2 |

(Continued)

FOREIGN PATENT DOCUMENTS

| | | |
|---|---|---|
| JP | 2009-104473 A | 5/2009 |
| KR | 10-2014-0027605 A | 3/2014 |

(Continued)

*Primary Examiner* — Julie B Lieu
(74) *Attorney, Agent, or Firm* — Cha & Reiter, LLC

(57) ABSTRACT

Various embodiments relate to an electronic device and a method for outputting an alert, and a system comprising a locking device coupled to the electronic device. To this end, the electronic device, according to various embodiments, comprises: a connection terminal; and a processor, wherein the processor is configured to: detect a connection with a locking device via the connection terminal; receive an identifier of the locking device from the locking device; identify the received identifier to set the electronic device in an alert mode; detect a disconnection between the electronic (Continued)

device and the locking device; and output an alert in response to the detected disconnection. Other embodiments may be possible.

12 Claims, 8 Drawing Sheets

(51) Int. Cl.
<table>
<tr><td>G06F 1/26</td><td>(2006.01)</td></tr>
<tr><td>G06F 21/88</td><td>(2013.01)</td></tr>
<tr><td>G08B 7/06</td><td>(2006.01)</td></tr>
<tr><td>H02J 7/00</td><td>(2006.01)</td></tr>
<tr><td>H01R 24/60</td><td>(2011.01)</td></tr>
<tr><td>H01R 107/00</td><td>(2006.01)</td></tr>
</table>

(52) U.S. Cl.
CPC ............ *H02J 7/0047* (2013.01); *H01R 24/60* (2013.01); *H01R 2107/00* (2013.01)

(58) Field of Classification Search
CPC .. E05B 49/00; E05B 73/0005; E05B 73/0082; G08B 3/10; G08B 5/36; G08B 13/24; G08B 13/22; G08B 7/06; G07C 9/20; G06F 1/266; G06F 21/88; H01R 24/60; H01R 2017/00; H02J 7/0047
See application file for complete search history.

(56) References Cited

U.S. PATENT DOCUMENTS

| | | | | |
|---|---|---|---|---|
| 8,736,450 | B2* | 5/2014 | Brown | E05B 73/0005 |
| | | | | 340/568.2 |
| 9,222,285 | B1* | 12/2015 | Ilislamloo | E05B 41/00 |
| 9,640,051 | B2* | 5/2017 | Conaty | G08B 13/12 |
| 2003/0151510 | A1* | 8/2003 | Quintana | G08B 13/1445 |
| | | | | 340/568.2 |
| 2008/0045069 | A1* | 2/2008 | Haren | G08B 13/1409 |
| | | | | 439/352 |
| 2008/0055053 | A1* | 3/2008 | Hanyu | G08B 3/10 |
| | | | | 340/326 |
| 2008/0297345 | A1* | 12/2008 | Chen | G08B 13/1436 |
| | | | | 340/568.1 |
| 2009/0189765 | A1* | 7/2009 | Lev | E05B 45/005 |
| | | | | 340/568.2 |
| 2010/0308996 | A1* | 12/2010 | Chang | G08B 13/1409 |
| | | | | 340/568.2 |
| 2011/0175733 | A1* | 7/2011 | Billiard | G08B 25/009 |
| | | | | 340/568.1 |
| 2013/0194096 | A1* | 8/2013 | Belden, Jr | G08B 13/1463 |
| | | | | 340/568.4 |
| 2014/0035747 | A1* | 2/2014 | Ewen, III | G08B 13/1418 |
| | | | | 340/568.2 |
| 2014/0210622 | A1* | 7/2014 | Bailey | G08B 13/1436 |
| | | | | 340/568.1 |
| 2014/0326027 | A1* | 11/2014 | Avganim | G07C 9/00174 |
| | | | | 70/275 |
| 2015/0097681 | A1* | 4/2015 | Fadell | G01N 33/0031 |
| | | | | 340/628 |
| 2016/0117268 | A1* | 4/2016 | Griffin | G06F 13/102 |
| | | | | 710/10 |
| 2016/0323620 | A1* | 11/2016 | Kim | H04N 21/4122 |
| 2016/0342492 | A1 | 11/2016 | Chen et al. | |
| 2016/0364360 | A1* | 12/2016 | Lim | H04N 21/440218 |
| 2017/0018156 | A1 | 1/2017 | Kim | |
| 2017/0097666 | A1 | 4/2017 | Shin et al. | |
| 2017/0222366 | A1* | 8/2017 | Gee | H01R 13/639 |
| 2017/0317583 | A1* | 11/2017 | Forghani-Zadeh | H03K 17/04206 |
| 2018/0230713 | A1* | 8/2018 | Sidhu | E05B 49/00 |
| 2018/0260208 | A1* | 9/2018 | Lin | E05B 47/00 |
| 2018/0276178 | A1* | 9/2018 | Lee | G06F 13/102 |
| 2019/0122511 | A1* | 4/2019 | Hicks | G08B 25/008 |
| 2019/0129492 | A1* | 5/2019 | Chen | G06F 1/266 |
| 2019/0181590 | A1* | 6/2019 | Bae | H01R 13/6683 |
| 2021/0109878 | A1* | 4/2021 | Jiang | G06F 13/382 |
| 2021/0200705 | A1* | 7/2021 | Jiang | G06F 13/385 |

FOREIGN PATENT DOCUMENTS

| | | |
|---|---|---|
| KR | 10-1507856 B1 | 4/2015 |
| KR | 10-2016-0137352 A | 11/2016 |
| KR | 10-2017-0040029 A | 4/2017 |

* cited by examiner

ELECTRONIC DEVICE AND METHOD FOR OUTPUTTING ALERT, AND SYSTEM COMPRISING LOCKING DEVICE COUPLED TO ELECTRONIC DEVICE

This application is a National Phase Entry of PCT International Application No. PCT/KR2019/000655, which was filed on Jan. 16, 2019 and claims priority to Korean Patent Application No. 10-2018-0022238, which was filed on Feb. 23, 2018, the contents of which are incorporated herein by reference.

BACKGROUND

1. Field

Various embodiments relate to an electronic device and method for outputting an alarm, and a system including a locking device coupled to the electronic device.

2. Description of the Related Art

Recently, various services and additional functions provided by electronic devices are gradually expanding. In order to increase the effective value of such electronic devices and satisfy various needs of users, communication service providers or electronic device manufacturers provide more various functions and develop electronic devices competitively in order to differentiate the same from those of other companies.

Such an electronic device may be charged by receiving power through a cable (e.g., a USB cable) connected to a charger, and the cable may be used as a locking device in order to prevent theft of the electronic device.

SUMMARY

A locking device for preventing theft may include a switch, or may use a dedicated recognition signal in order to prevent theft. For example, when the electronic device and the cable are forcibly disconnected in the state in which the electronic device and the locking device are connected, an alarm indicating theft is output from a separate alarm device connected to the cable.

In this way, since a separate dedicated recognition signal is used to prevent theft and a separate alarm device is provided for outputting an alarm indicating that a theft is occurring, the circuit of the locking device may be complicated and additional costs may be incurred. In addition, since an alarm is output only from the separate alarm device and no alarm is output from the electronic device, it is not effective for preventing theft.

According to various embodiments, it is possible to provide an electronic device and a method for outputting an alarm and a system including a locking device connected to the electronic device.

According to various embodiments, it is possible to output an alarm from an electronic device when a theft occurs without a separate signal line for preventing theft and a separate alarm device for outputting an alarm for indicating that a theft is occurring.

An electronic device according to various embodiments may include a connection terminal and a processor. The processor may be configured to: detect a connection with a locking device via the connection terminal; receive an identifier of the locking device from the locking device; identify the received identifier and set the electronic device to an alarm mode; detect a disconnection between the electronic device and the locking device; and output an alarm in response to the detected disconnection.

According to various embodiments, an alarm output method of an electronic device may include: an operation of detecting a connection with a locking device via the connection terminal; an operation of receiving an identifier of the locking device from the locking device; an operation of identifying the received identifier and setting the electronic device to an alarm mode; an operation of detecting a disconnection between the electronic device and the locking device; and an operation of outputting an alarm in response to the detected disconnection.

According to various embodiments, a system may include an electronic device and a locking device configured to be connected with the electronic device via a connection terminal of the electronic device, wherein the locking device may include a first connection terminal to be connected with a charger and a second connection terminal to be connected with the electronic device, and the electronic device may be configured to: detect a connection with the locking device via the second connection terminal; receive an identifier of the locking device from the locking device; identify the received identifier and set the electronic device to an alarm mode; detect a disconnection from the second connection terminal of the locking device; and output an alarm in response to the detected disconnection.

According to various embodiments, when a theft occurs, the electronic device detects a disconnection from the locking device and outputs an alarm, thereby preventing the theft.

In addition, according to various embodiments, an alarm for indicating that a theft is occurring is output from the electronic device without using a separate recognition signal for preventing theft. Thus, additional costs for the provision of a separate alarm device can be reduced.

DETAILED DESCRIPTION

Figure 1:
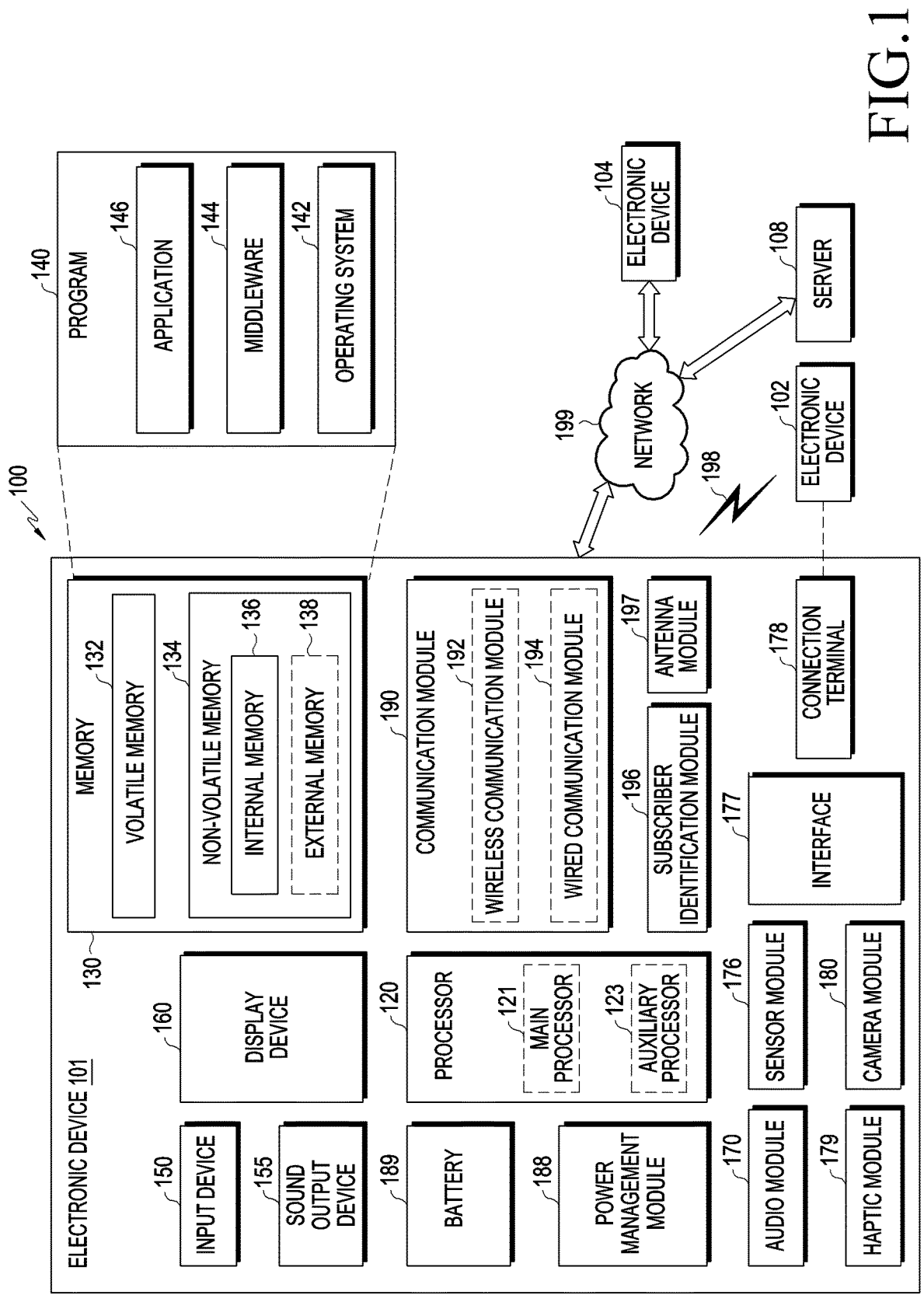
FIG. 1 is a block diagram illustrating an electronic device 101 according to various embodiments in a network environment 100.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
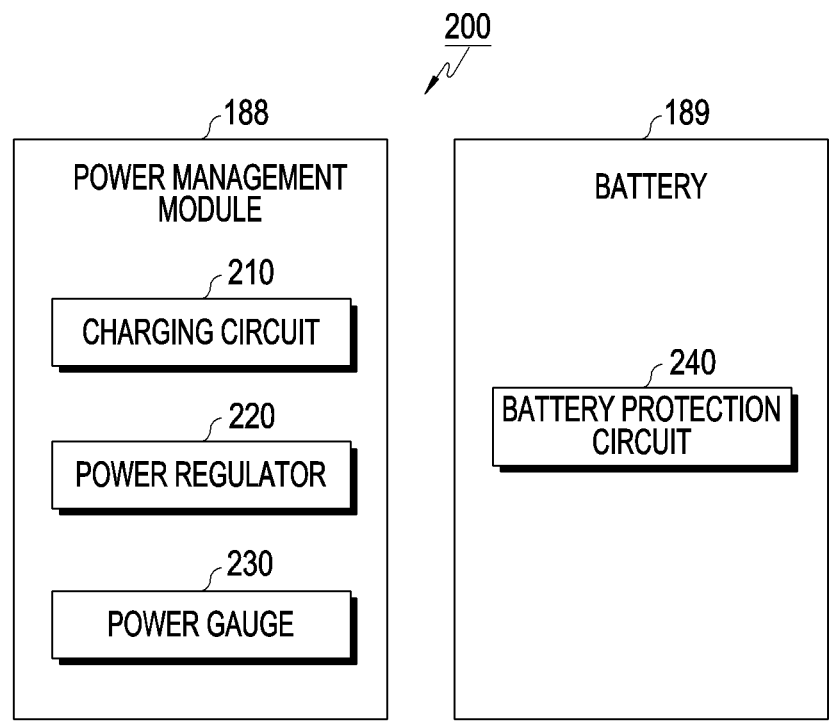
FIG. 2 is a block diagram illustrating a power management module 188 and a battery 189 according to various embodiments.

FIG. 2 is a block diagram 200 illustrating a power management module 188 and a battery 189 according to various embodiments.

Referring to FIG. 2, the power management module 188 may include a charging circuit 210, a power regulator 220, or a power gauge 230 (or a fuel gauge). The charging circuit 210 may charge a battery 189 using the power supplied from an external power source for the electronic device 101. According to an embodiment, the charging circuit 210 may select a charging method (e.g., normal charging or quick charging) based on at least some of the type of an external power source (e.g., a power adapter, USB, or wireless charging), the magnitude of power capable of being supplied from the external power source (e.g., about 20 watts or more), or the attributes of the battery 189, and may charge the battery 189 using the selected charging method. The external power source may be connected with the electronic device 101, for example, in a wired manner via a connection terminal 178 or in a wireless manner via an antenna module 197.

The power regulator 220 may generate multiple kinds of power having different voltages or different current levels by adjusting the voltage level or the current level of the power supplied from, for example, the external power source or the battery 189. The power regulator 220 may adjust the power from the external power source or the battery 189 to a voltage or current level suitable for each of some components among the components included in the electronic device 101. According to an embodiment, the power regulator 220 may be implemented as a low-drop-out (LDO) regulator or a switching regulator. The power gauge 230 may measure the use state information of the battery 189 (e.g., the capacity, the charging/discharging frequency, the voltage, or the temperature of the battery 189).

The power management module 188 may determine charging state information (e.g., life, overvoltage, undervoltage, overcurrent, overcharge, over discharge, overheating, short circuit, or swelling) associated with the charging of the battery 189 at least partially based on the measured use state information using, for example, the charging circuit 210, the voltage regulator 220, or the fuel gauge 230. The power management module 188 may determine whether the battery 189 is abnormal or normal based partially on the determined charging state information. When it is determined that the state of the battery 189 is abnormal, the power management module 188 may adjust the charging of the battery 189 (e.g., reduce the charging current or voltage, or stop charging). According to an embodiment, at least some of the functions of the power management module 188 may be performed by an external control device (e.g., the processor 120).

According to an embodiment, the battery 189 may include a battery protection circuit (e.g., a battery protection circuit module (PCM)) 240. The battery protection circuit 240 may perform one or more of various functions (e.g., a pre-blocking function) for preventing performance degradation or burnout of the battery 189. The battery protection circuit 240 may be configured in addition to, or as an alternative to, at least a part of a battery management system (BMS) for performing cell balancing, battery capacity measurement, charge/discharge frequency measurement, temperature measurement, or voltage measurement.

According to an embodiment, at least part of the use state information or the charging state information of the battery 189 may be measured using a corresponding sensor (e.g., a temperature sensor) of the sensor module 276, a power gauge 230, or the power management module 188. According to an embodiment, the corresponding sensor (e.g., a temperature sensor) of the sensor module 176 may be included as part of the battery protection circuit 140, or may be disposed in the vicinity of the battery 189 as a separate device.

An electronic device according to various embodiments disclosed herein may be any of various types of devices. The electronic device may include, for example, a portable communication device (e.g., a smartphone), a computer device, a portable multimedia device, a portable medical device, a camera, a wearable device, or a home appliance. The electronic device according to an embodiment disclosed herein is not limited to the above-described devices.

It should be understood that various embodiments disclosed herein and terms for describing the embodiments are not intended to limit the technical features disclosed herein to specific embodiments, and that the embodiments include various modifications, equivalents, and/or substitutions of the corresponding embodiments. In connection with the description of the drawings, similar components may be denoted by similar reference numerals. The singular form of a noun corresponding to an item may include one or more of the item unless the context clearly indicates otherwise. Herein, each of phrases, such as "A or B", "at least one of A and B", "at least one of A or B", "A, B, or C", "at least one of A, B, and C", or "at least one of A, B, or C" may include all possible combinations of the items listed together in the corresponding phrase among the phrases. Terms such as "$1^{st}$", "$2^{nd}$", "first", and "second" may simply be used to distinguish corresponding components from the other components, and the components are not limited in other respects (e.g., importance or order). When a certain (e.g., $1^{st}$) component is mentioned as being "coupled" or "connected" to another (e.g., $2^{nd}$) component, with or without the term "functionally" or "communicatively", it means that the certain component can be connected to the another component directly (e.g., in a wired manner), wirelessly, or via a third component.

The term "module" used herein may include a unit implemented in hardware, software, or firmware, and may be used interchangeably with terms such as "logic," "logic block", "component", "circuit", or the like. The module may be an integrally configured component or a minimum unit or a part of the component, which performs one or more functions. For example, according to an embodiment, the module may be implemented in the form of an application-specific integrated circuit (ASIC).

Various embodiments disclosed herein may be implemented by software (e.g., the program 140) including one or more instructions stored in a storage medium (e.g., the internal memory 136 or the external memory 138) readable by a machine (e.g., the electronic device 101). For example, a processor (e.g., the processor 120) of a machine (e.g., the electronic device 101) may call and execute at least one of the stored one or more instructions from the storage medium. This enables the machine to be operated to perform at least one function in response to the at least one called instruction. The one or more instructions may include code generated by a compiler or code capable of being executed by an interpreter. The machine-readable storage medium may be provided in the form of a non-transitory storage medium. Here, the term "non-transitory" merely means that the storage medium is a tangible device and does not contain a signal (e.g., electromagnetic waves), and this term is not intended to distinguish the case where data is permanently stored on the storage medium from the case where data is temporarily stored.

According to an embodiment, a method according to various embodiments disclosed herein may be provided in the manner of being included in a computer program product. The computer program product may be traded as a product between a seller and a purchaser. The computer program product may be distributed in the form of a machine-readable storage medium (e.g., a compact disc read-only memory (CD-ROM)), or may be directly distributed through an application store (e.g., Play Store™), directly between two user devices (e.g., smartphones), or may be distributed online (e.g., downloaded or uploaded). In the case of online distribution, at least part of the computer program product may be temporarily stored in or temporarily produced from a machine-readable storage medium such as a manufacturer's server, a server of an application store, or memory of a relay server.

According to various embodiments, each (e.g., a module or a program) of the above-described components may include one or more entities. According to various embodiments, one or more of the components or operations described above may be omitted, or one or more other components or operations may be added. Alternatively or additionally, a plurality of components (e.g., modules or programs) may be integrated into one component. In such a case, an integrated component may perform one or more functions of each of the plurality of components in the same or similar manner as when performed by the corresponding one of the plurality of components prior to the integration. According to various embodiments, operations performed by a module, a program, or other components may be performed sequentially, in parallel, repetitively, or heuristically, one or more of the operations may be performed in a different order or omitted, or one or more other operations may be added thereto.

Figure 3:
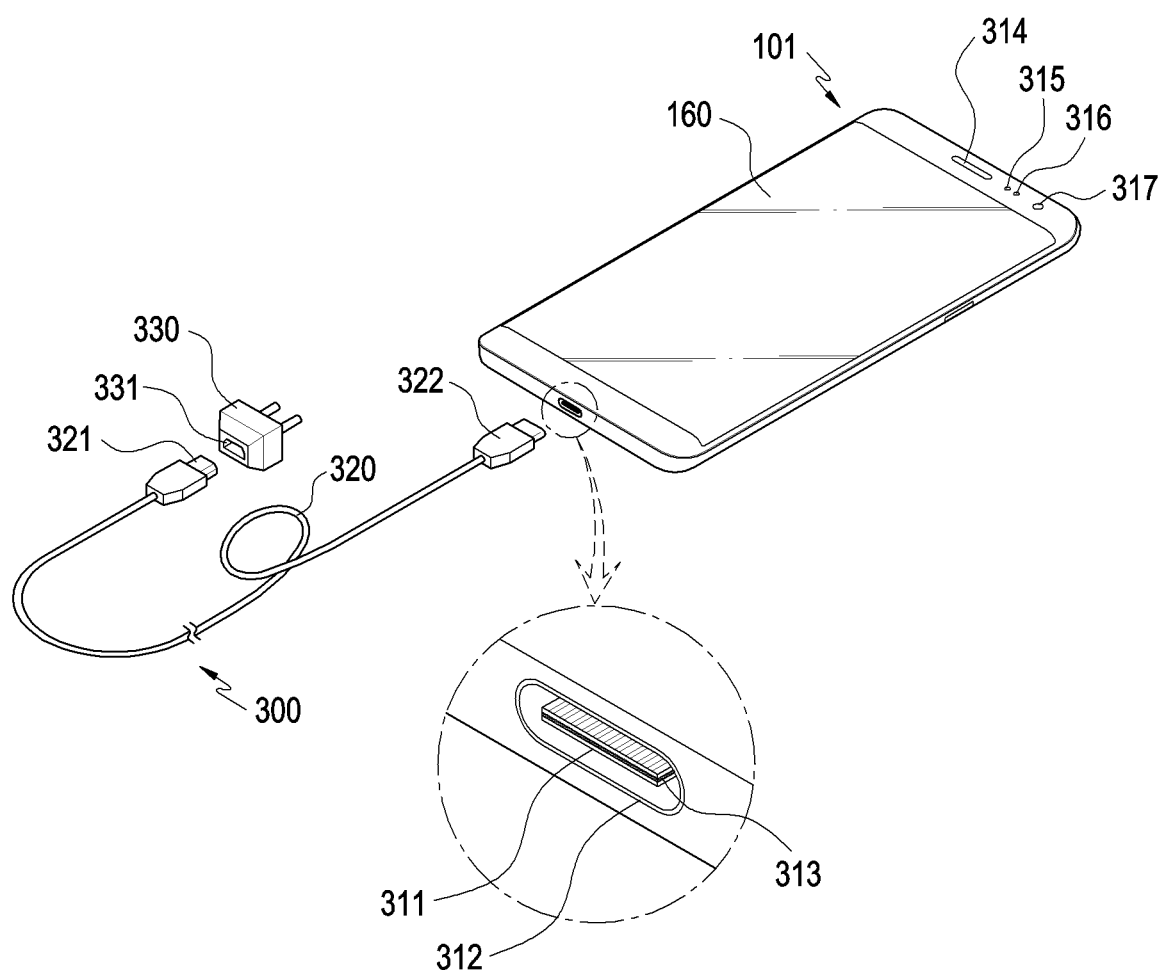
FIG. 3 an exemplary view illustrating an electronic device and a locking device according to various embodiments.

FIG. 3 an exemplary view illustrating an electronic device and a locking device according to various embodiments.

Referring to FIG. 3, a display 160 capable of detecting touch or hovering may be disposed in the center of the front surface of the electronic device 101. The display 160 may occupy a large portion of the front surface of the electronic device 101. In addition, in the upper end of the display 160, status bars (not illustrated) may be formed to indicate statuses, such as a battery charging state, a received signal intensity, and the current time.

According to various embodiments, the electronic device 101 may include a speaker 314, a proximity sensor 315, an illuminance sensor 316, or a camera 317 arranged in the upper end area of the front surface thereof. According to an embodiment, two cameras may be included in the upper end area of the front surface of the electronic device 101. The electronic device 101 may be provided with a connection terminal 312 (e.g., the connection terminal 178 in FIG. 1) that can be electrically connected to the locking device 300. The connection terminal 312 may be used as an interface for connecting the electronic device 101 and the locking device 300. The electronic device 101 may be connected to the charger 330 through a cable 320 connected to the locking device 300 under the control of the processor 120. According to an embodiment, the electronic device 101 may receive power from the charger 330 through the cable 320. A contact substrate 311 may be formed inside the connection terminal 312 of the electronic device 101. The contact substrate 311 may include twelve pins disposed on the top surface thereof and twelve pins disposed on the bottom surface thereof. A mid-plate 313 having an electrically conductive property may be disposed inside the contact substrate 311.

According to various embodiments, the electronic device 101 and the locking device 300 may be electrically connected. The connection terminal 312 of the electronic device 101 and a second connection terminal 322 of the locking device 300 have USB type C interfaces and can be electrically connected to each other. A first connection terminal 321 of USB type A is disposed at one end of the locking device 300, and the second connection terminal 322 of USB type C is disposed at the other end of the locking device 300. The first connection terminal 321 of the locking device 300 may be connected to the connection terminal 331 of the charger 330, and the second connection terminal 322 of the locking device 300 may be connected to the connection terminal 312 of the electronic device 101. In addition, the first connection terminal 321 and the second connection terminal 322 of the locking device 300 may be connected by a cable 320.

According to various embodiments, the locking device 300 may provide power to the electronic device 101 through the cable 320, and the electronic device 101 may receive power from the charger 330 through the cable 320. The cable 320 may include a USB type C interface and a USB type A interface. Alternatively, the first connection terminal 321 of the cable 320 may have a USB 2.0 or USB 3.0 interface. The locking device 300 may take the form of a cable, but may be used in the form of a circuit including wiring depending on the purpose of use thereof. The electronic device 101 and the locking device 300 may transmit and receive an identifier for identifying the locking device 300.

According to various embodiments, the locking device 300 may include, on the exterior thereof, a first connection terminal 321 capable of being connected to the charger 330 and a second connection terminal 322 capable of being connected to the electronic device 101. One end of the locking device 300 (e.g., an end connected to the charger 330 via a USB interface) may include an over-voltage protection (OVP) for adjusting the power supplied from the charger 330, a linear regulator for providing the adjusted power to the electronic device 101, a switch for opening or connecting a path with the electronic device 101, and a power delivery integrated circuit (PD IC) for delivering the identifier of the locking device 300 to the electronic device 101 via a CC pin of USB type C. The electronic device 101 may receive the identifier of the locking device 300 from the PD IC of the locking device 300 through the CC pin, and may recognize the locking device 300 based on the received identifier. The electronic device 101 may set the electronic device 101 to an alarm mode when the received identifier is identified (e.g., when it is identified that the received identifier and the identifier previously stored in the electronic device 101 are the same).

Figure 4:
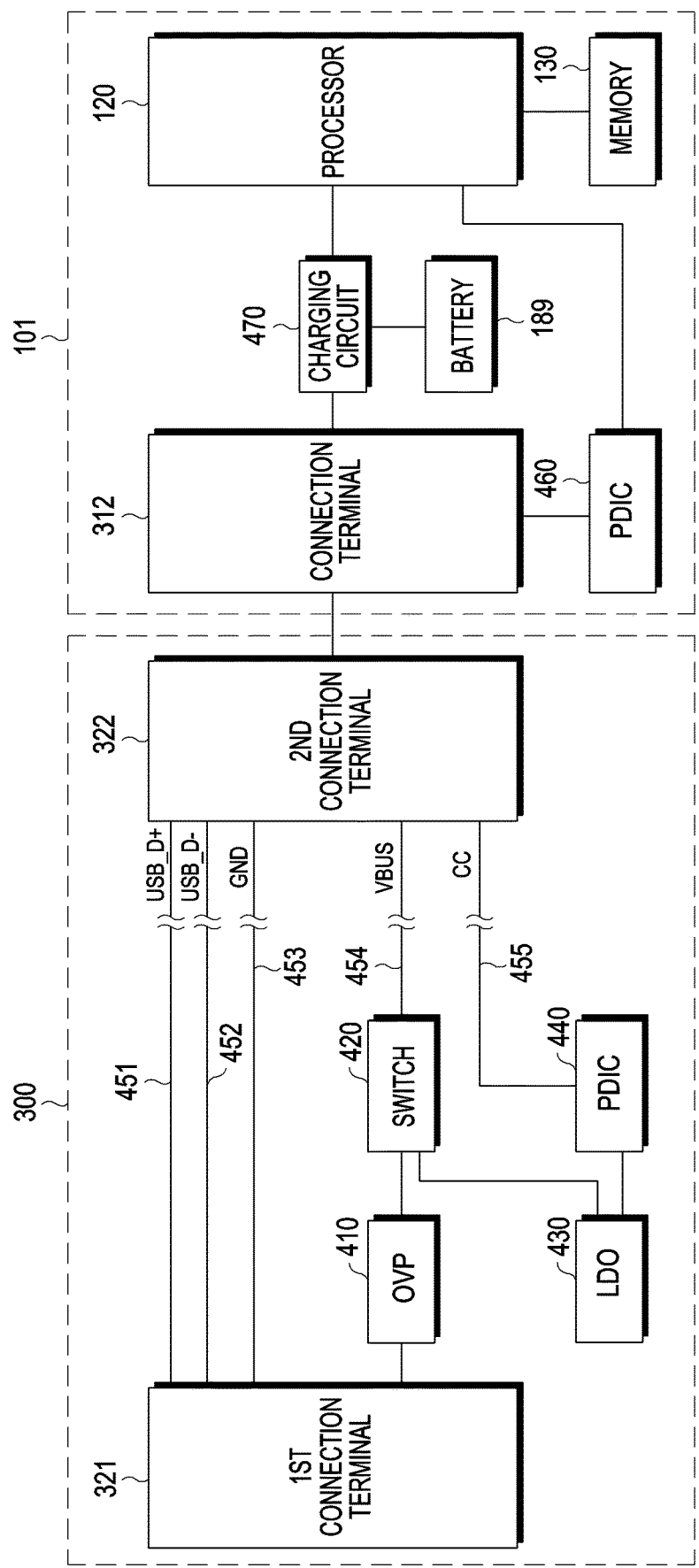
FIG. 4 is a block diagram of an electronic device and a locking device according to various embodiments.

FIG. 4 is a block diagram of an electronic device and a locking device according to various embodiments.

Referring to FIG. 4, the locking device 300 may include a first connection terminal 321 having a USB type A interface capable of being connected to the charger 330 and a second connection terminal 322 having a USB type C interface capable of being connected to the electronic device 101. According to an embodiment, the first connection terminal 321 may include various interfaces capable of providing power supplied from the charger 330 to the electronic device 101, in addition to the USB type A interface. According to an embodiment, the first connection terminal 321 may be located at one end of the locking device 300, and the second connection terminal 322 may be located at the other end of the locking device 300. The locking device 300 may include the first connection terminal 321 and the second connection terminal 322 disposed at the end of a USB cable. One end of the locking device 300 (e.g., an end position capable of being connected to the charger 330) may include an over-voltage protection (OVP) 410 for adjusting the power supplied from the charger 330, an LDO 403 for supplying the adjusted power (e.g., 3.3 V) to the electronic device 101, a switch 420 for opening or connecting a path with the electronic device 101, and a power delivery integrated circuit (PD IC) 440 for delivering an identifier of the locking device 300 to the electronic device 101 via a CC pin of USB type C. The OVP 410 may instantaneously block a high voltage to protect damage to the locking device 300. While the voltage supplied from the charger 330 is adjusted and provided to the electronic device 101, the OVP 410 is capable of instantaneously adjusting (e.g., blocking) a high voltage so as to protect the USB interface. The LDO 430 is a linear regulator capable of operating even at a low input/output potential difference, and a transistor may be disposed between the input voltage Vin and the output voltage Vout so as to supply a stable voltage. The first connection terminal 321 and the second connection terminal 322 of the locking device 300 may be connected via a USB_D+ line 451, a USB_D– line 452, and a ground (GND) line 453. In addition, the switch 420 and the second connection terminal 322 are disposed on the VBUS line 454, and the power delivery integrated circuit (PD IC) 440 and the second connection terminal 322 may be connected to each together via a CC line 455. When the PD IC 440 is connected to the electronic device 101 via the second connection terminal 322, the PD IC 440 may transmit/receive a control signal for supplying power to the electronic device 101 to/from the electronic device 101 via the CC terminal of the second connection terminal 322. According to an embodiment, when the locking device 300 is supplied with power from the electronic device 101 via the VBUS line 454 of the second connection terminal 322, the PD IC 440 of the locking device 300 may be activated based on the power supplied from the electronic device 101 to transmit the identifier of the locking device 300 to the electronic device 101.

According to various embodiments, when the locking device 300 is connected to the electronic device 101 via a USB cable, the electronic device 101 may be operated as a host, and the locking device 300 may be operated as a device. The first connection terminal 321 of the locking device 300 may be connected to the charger 330, and the second connection terminal 322 may be electrically connected to the connection terminal 312 of the electronic device 101 via the USB cable. According to an embodiment, the connection terminal 322 of the locking device 300 may use a pin included in the USB type C in order to supply power, based on the current voltage of the charger 330, to the electronic device 101. The pin may include at least one of a CC pin, a data (D+, D−) pin, a transmission pin (TX+, TX−), a reception pin (RX+, RX−), or a power supply pin (VBUS) included in the USB type C. According to an embodiment, the connection terminal 322 of the locking device 300 may use a pin included in USB type C in order to supply a unique identifier of the locking device 300 to the electronic device 101. The pin may include at least one of a CC pin, a data (D+, D−) pin, a transmission pin (TX+, TX−), a reception pin (RX+, RX−), or a power supply pin (VBUS) included in the USB type C.

According to various embodiments, the PD IC 440 of the locking device 300 may be connected to the CC pin of the second connection terminal 322 via an electrical wire 455, and may deliver the identifier of the locking device 300 to the electronic device 101 via the CC pin of USB type C. The identifier may be transmitted in the state of being formed in an unstructured vendor-defined message (UVDM) transmitted/received in communication for power transmission based on the USB type C.

According to various embodiments, the header of the UVDM is shown in [Table 1] below.

TABLE 1

| Bit(s) | Parameter | Description |
|---|---|---|
| B31 . . . 16 | Vendor ID (VID) | Unique 16-bit unsigned integer. Assigned by the USB-IF to the Vendor |
| B15 | VDM Type | 0 = Unstructured VDM |
| B14 . . . 0 | Available for Vendor Use | Content of this field is defined by the vendor |

In Table 1, "Vendor ID (VID)" has a 16-bit unsigned integer value, and "VDM Type" is assigned a value of "0". The identifier may be included in the "VDM Type" assigned "0". According to various embodiments, the OVP 410 of the locking device 300 may instantaneously block a high voltage so as to supply a stable voltage to the electronic device 101 via the switch 420. According to an embodiment, the OVP 410 may adjust the power supplied from the charger 330 to a predefined voltage. The predefined voltage may include 5V, 9V, 12V or 20V.

According to various embodiments, the switch 420 of the locking device 300 may include at least one metal oxide semiconductor field effect transistor (MOSFET). According to an embodiment, the switch 420 may include an ON/OFF switch. The switch 420 may deliver the voltage output from the OVP 410 to the electronic device 101 via the second connection terminal 322.

According to various embodiments, the LDO 430 may supply power to the PD IC 440 so as to enable the PD IC 440 to transmit the identifier of the locking device 300 to the electronic device 101. When the PD IC 440 is connected to the electronic device 101, the identifier of the locking device 300 may be delivered to the electronic device 101 through the CC pin of USB type C.

For reference, according to various embodiments, at least one of the above-described components may be excluded from the locking device 300, or the locking device 300 may further include various components required to provide an identifier to the electronic device 101 in addition to the above-described components.

Referring to FIG. 4, the electronic device 101 may include a processor 120, a connection terminal 312, a battery 189, memory 130, a charging circuit 470, and a PD IC 460. For reference, according to various embodiments, at least one of the above-described components may be excluded from the electronic device 101, or the electronic device 101 may further include various components required to receive an identifier of the locking device 300 from the locking device 300 and to output an alarm depending on whether or not the electronic device 101 is disconnected from the locking device 300, in addition to the above-described elements.

According to various embodiments, the connection terminal 312 of the electronic device 101 may be electrically connected to the connection terminal 322 of the locking device 300 via a USB cable. The USB cable may include a USB type C connector. The electronic device 101 may include a USB type C connector disposed on the exterior thereof, and may be electrically connected to the USB type C connector.

According to various embodiments, the PD IC 460 of the electronic device 101 may receive the identifier from the locking device 300 via the CC terminal of USB type C. When the PD IC 460 is connected to the locking device 300 via a USB cable, the identifier may be received from the locking device 300.

According to various embodiments, the charging circuit 470 of the electronic device 101 may perform an operation of charging power, supplied from the locking device 300, to the battery 189. The charging circuit 470 may operate the electronic device 101 using the power charged in the battery 189.

According to various embodiments, the memory 130 of the electronic device 101 may store identification information about the locking device 300. The memory 130 may execute at least one piece of information or at least one function stored in the memory 130 of FIG. 1.

According to various embodiments, the processor 120 of the electronic device 101 may control one or more other components of the electronic device 101 connected to the processor 120, and may perform various data processing and calculations. According to an embodiment, the processor 120 may load and process the identifier pre-stored in the memory 130 in order to identify the identifier received from the locking device 300. The processor 120 may perform at least one function or operation performed in the processor 120 of FIG. 1.

According to various embodiments, the processor 120 of the electronic device 101 may be configured to: detect a connection with the locking device 300 via the connection terminal 312; receive an identifier of the locking device 300 from the locking device 300; identify the received identifier so as to set the electronic device 101 to an alarm mode; and output an alarm sound to a sound output device 155 or output an alarm massage via the display device 160 when the connection between the electronic device 101 and the locking device 300 is released.

According to various embodiments, when a connection with the locking device 300 is detected, the processor 120 of the electronic device 101 may determine the electronic device 101 to be a host and may perform an operation based on on-the-go (OTG). When the electronic device 101 is determined to be the host, the processor 120 of the electronic device 101 may provide power to the locking device 300 so as to operate the locking device 300, and may receive the identifier of the locking device 300 from the locking device 300 via the CC pin of the connection terminal 312 based on the provided power. According to an embodiment, in the state in which the alarm is output, when an input for releasing the alarm is received, the processor 120 of the electronic device 101 may stop outputting the alarm. According to an embodiment, when the input for releasing the alarm is not received for a predetermined time (e.g., 30 seconds), the processor 120 of the electronic device 101 may switch the electronic device 101 to a locking mode. For example, when an input for releasing the alarm is not input for the predetermined time (e.g., 30 seconds), the electronic device 101 may be switched to the locking mode in which at least one function or operation that can be provided by the electronic device 101 cannot be executed.

According to various embodiments, the electronic device 101 may continuously detect whether a bias voltage level supplied via the CC pin of USB type C of the electronic device 101 is changed. According to an embodiment, the processor 120 of the electronic device 101 may detect a bias voltage applied across the CC pin of the connection terminal 312 and the GND while the connection with the second connection terminal 322 of the locking device 300 is maintained via the connection terminal 312. The processor 120 of the electronic device 101 may recognize that the connection with the locking device 300 is maintained when the detected bias voltage is within a predetermined voltage range (e.g., 0.25V to 0.61V). According to another embodiment, the processor 120 of the electronic device 101 may recognize that the connection with the locking device 300 is released when the detected bias voltage is not included within the predetermined voltage range (e.g., 0.25V to 0.61V).

According to various embodiments, when the bias voltage level is changed, the electronic device 101 may recognize that the connection with the locking device 300 is released. According to an embodiment, when it is recognized that the connection with the locking device 300 is released, the processor 120 of the electronic device 101 may output an alarm (e.g., an alarm sound and/or an alarm message) indicating theft. According to an embodiment, in the state in which power, supplied via the locking device 300 in the state in which the locking device 300 is connected with the charger 330, is charged to the battery 189 of the electronic device 101, when the connection between the first connection terminal 321 of the locking device 300 and the charger 330 is released or the cable 320 of the locking device 330 is cut and thus the power is not supplied, the processor 120 of the electronic device 101 may output an alarm (e.g., an alarm sound and/or an alarm message) indicating theft.

According to various embodiments, the electronic device 101 may include a connection terminal 312 and a processor 120. The processor 120 may be configured to: detect a connection with the locking device 300 via the connection terminal 312; receive an identifier of the locking device 300 from the locking device 300, identify the received identifier so as to set the electronic device 101 to an alarm mode; detect a disconnection between the electronic device 101 and the locking device 300, and output an alarm in response to the detected disconnection.

According to an embodiment, the connection terminal 312 may include a USB type C, and the identifier may be received via a configuration channel (CC) pin of USB type C.

According to an embodiment, the processor 120 may be configured to perform an operation based on on-the-go (OTG) and determine the electronic device 101 to be a host, based on a connection with the locking device 300 being detected.

According to an embodiment, the processor 120 may be configured to provide power to the locking device 300 to operate the locking device 300 based on the electronic device 101 being determined to be the host.

According to an embodiment, the processor 120 may be configured to stop outputting the alarm based on an input for releasing the alarm being received in the state in which the alarm is being output.

According to an embodiment, the processor 120 may be configured to switch the electronic device 101 to a locking mode based on the input for releasing the alarm is not received for a predetermined time.

According to an embodiment, the processor 120 may be configured to output the alarm based on a change in a bias voltage level received via the CC pin of USB type C.

According to an embodiment, the electronic device 101 may further include a battery 189, and the processor 120 may be configured to: charge power, supplied via the locking device 300, to the battery in the state in which the locking device 300 is connected with a charger 330, and output the alarm based on the power being not supplied.

According to various embodiments, a system may include an electronic device and a locking device, wherein the locking device 300 may include a first connection terminal 321 to be connected with a charger 330 and a second connection terminal 322 to be connected with the electronic device 101, and the electronic device 101 may be configured to: detect a connection with the locking device 300; receive an identifier of the locking device 300 from the locking device 300, identify the received identifier and set the electronic device 101 to an alarm mode; detect a disconnection from the second connection terminal 322 of the locking device 300, and output an alarm in response to the detected disconnection.

According to an embodiment, the connection terminal 312 of the electronic device 101 and the second connection terminal 322 of the locking device 300 may be connected based on a USB type C, and the identifier may be transmitted via a configuration channel (CC) pin of USB type C.

According to an embodiment, based on detecting a connection with the second connection terminal 322 of the locking device 300, the electronic device 101 may determine itself 101 to be a host, may provide power to the locking device 300 in order to operate the locking device 300, and may receive the identifier based on the provided power.

According to an embodiment, the electronic device 101 may be configured to detect that the connection with the locking device 300 based on a change in a bias voltage level received via the CC pin of USB type C.

According to an embodiment, the locking device 300 is connected to the charger 330 via the first connection terminal 321, and may be configured to: operate in a source mode when the locking device 300 is connected with the electronic device 101 via the second connection terminal 322, and operate in a sink mode when the connection with the charger 330 is released.

Figure 5:
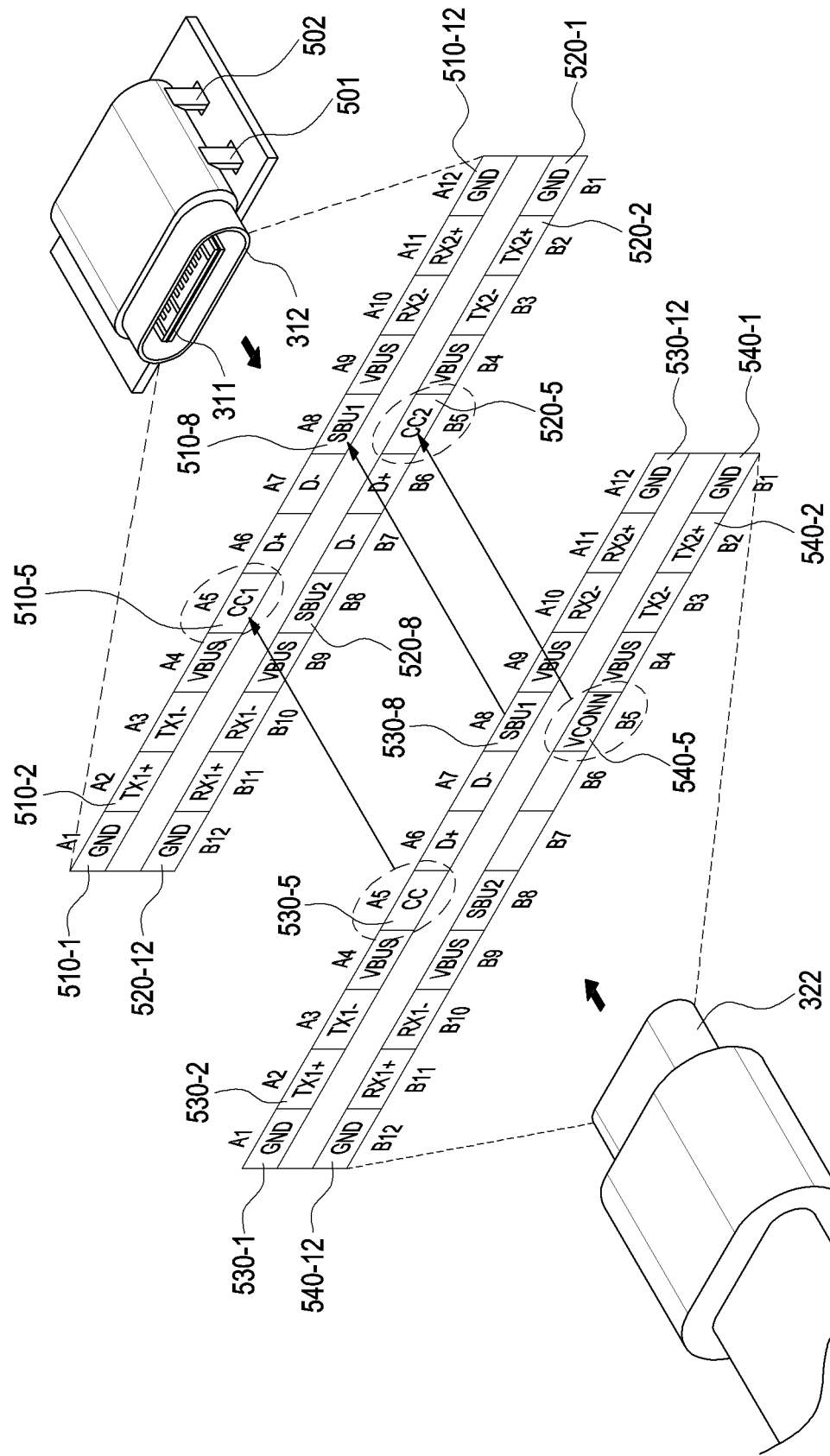
FIG. 5 is an exemplary view illustrating functions of a plurality of terminals for a USB type C interface between a connection terminal of an electronic device 101 and a connection terminal of a locking device 300 according to various embodiments.

FIG. 5 is an exemplary view illustrating functions of a plurality of terminals for a USB type C interface between a connection terminal of an electronic device 101 and a connection terminal of a locking device 300 according to various embodiments.

The USB type C is a physical standard for a connection terminal (or a socket) for a USB device or a cable, and is smaller in size than the USB type A, and is easily connected with the electronic device 101 because there is no distinction between front and rear. The data transmission capability of USB type C is 10 Gbps, and the maximum power transmission capability of USB type C is 100 W. In addition, the USB type C is compatible with USB 2.0 and USB 3.0.

Referring to FIG. 5, the electronic device 101 may be electrically connected to the connection terminal 322 of the locking device 300 via the connection terminal 312 (e.g., the connection terminal 178 in FIG. 1). The connection terminal 312 of the electronic device 101 may be disposed on the exterior such that the connection terminal 322 of the locking device 300 can be inserted in any direction, and a contact substrate 311 may be disposed inside the connection terminal 312 of the electronic device 101. The contact substrate 311 may have twelve pins 510-1, 510-2, ..., and 510-12 disposed on the top surface, and twelve pins 520-1, 520-2, ..., and 520-12 disposed on the bottom surface. A mid-plate 313 having an electrically conductive property may be disposed inside the contact substrate 311. In addition, the connection terminal 322 located at the end of the wired cable 320 may include twelve pins 530-1, 530-2, ..., and 530-12 disposed at the upper end thereof to come into contact with the twelve pins 510-1, 510-2, ..., and 510-12 disposed on the top surface of the contact substrate 311, and may include twelve pins 540-1, 540-2, ..., and 540-12 disposed at the lower end thereof to come into contact with the twelve pins 520-1, 520-2, ..., and 520-12 disposed on the bottom surface of the contact substrate 311. The number of pins configured on the connection terminal 322 of the locking device 300 may vary depending on the type of the electronic device 101. In addition, depending on the type of USB type-C interface between the connection terminal 311 of the electronic device 101 and the connection terminal 322 of the locking device 300, there may be one or two CC pins. For example, the arrangement order of the twelve pins disposed on the top surface may be the same as the arrangement order of the twelve pins disposed on the lower surface such that the connection terminal 322 of the locking device 300 can be inserted into the connection terminal 312 of the electronic device 101 in any direction. Due to this structure, the user can insert the connection terminal 322 of the locking device 300 into the connection terminal 312 of the electronic device 101 in the state of being rotated by 180 degrees.

The arrangement of the pins disposed on the top and bottom surfaces of the contact substrate 311 is shown in Table 2 below.

TABLE 2

| Pin | Pin | Name | Function | Note |
| --- | --- | --- | --- | --- |
| A1 | B1 | GND | Power | Support for 60 W minimum (combined with all VBUS pins) |
| A2 | B2 | TX1+ | USB 3.1 or Alternate Mode | 10 Gb/s differential pair with TX1− |
| A3 | B3 | TX1− | USB 3.1 or Alternate Mode | 10 Gb/s differential pair with TX1+ |
| A4 | B4 | VBUS | Power | Support for 60 W minimum (combined with all VBUS pins) |
| A5 | B5 | CC1 | CC or VCONN | — |
| A6 | B6 | D+ | USB 2.0 | — |

TABLE 2-continued

| Pin | Pin | Name | Function | Note |
| --- | --- | --- | --- | --- |
| A7 | B7 | D− | USB 2.0 | — |
| A8 | B8 | SBU1 | Alternate Mode | Lower speed side band signal |
| A9 | B9 | VBUS | Power | Support for 60 W minimum (combined with all VBUS pins) |
| A10 | B10 | RX2− | USB 3.1 or Alternate Mode | 10 Gb/s differential pair with RX2+ |
| A11 | B11 | RX2+ | USB 3.1 or Alternate Mode | 10 Gb/s differential pair with RX2− |
| A12 | B12 | GND | Power | Support for 60 W minimum (combined with all VBUS pins) |

USB Type C has 24 pins. Due to reversibility, 24 pins can be arranged in a mirrored configuration. Due to this structure, the user may fit the connection terminal 322 of USB type C disposed at the end of the locking device 300 into the connection terminal 312 of the electronic device 101 in the state of being rotated by 180 degrees. In this case, symmetric pins may not be used together. For example, when TX1+ and TX1− are used, TX2+ and TX2−, symmetrical therewith, may not be used, and when RX1+ and RX1− are used, RX2+ and RX2−, symmetrical therewith, may not be used. Which pin is to be used may be determined depending on the cable that is connected, and the connection state between the connection terminal 322 of the locking device 300 attached to the end of the cable and the connection terminal 312 of the electronic device 101 electrically connected with the connection terminal 322 of the locking device 300. The CC1 pin 510-5 disposed on the top surface of the contact substrate 311 in the connection terminal 312 of the electronic device 101 and the CC2 pin 520-5 disposed on the bottom surface may be used to identify the locking device 300 that is connected to the connection terminal 312. For example, when the CC1 pin 510-5 of the electronic device 101 is connected to the CC pin 530-5 of the locking device 300 by being inserted into the connection terminal 312 of the electronic device 101 in the state in which the top surface of the connection terminal 322 of the locking device 300 faces upwards, the locking device 300 may provide the identifier thereof to the electronic device 101 via the CC1 pin 510-5 of the electronic device 101. The identifier may be a unique identifier for identifying the locking device. For example, when the CC2 pin 520-5 of the electronic device 101 is connected to the CC pin 530-5 of the locking device 300 by being inserted into the connection terminal 312 of the electronic device 101 in the state in which the top surface of the connection terminal 322 of the locking device 300 faces downwards, the locking device 300 may provide the identifier thereof to the electronic device 101 via the CC2 pin 520-5 of the electronic device 101. The CC pins 510-5 and 520-5 of the electronic device 101 may be connected to the CC or VCONN of the locking device 300.

Figure 6:
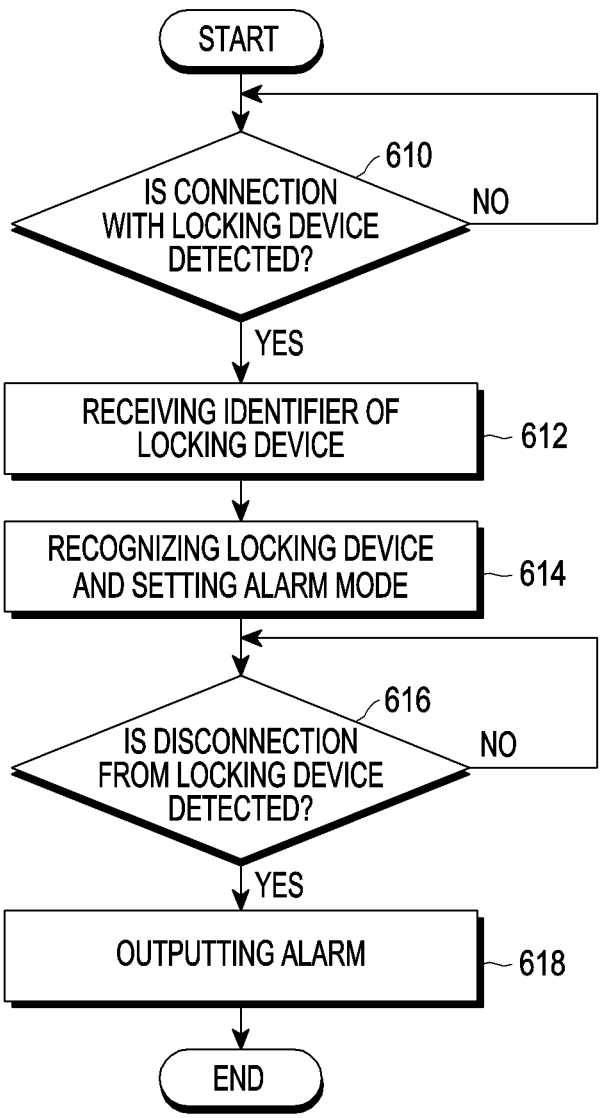
FIG. 6 is a flowchart illustrating an alarm output method of an electronic device according to various embodiments.

FIG. 6 is a flowchart illustrating an alarm output method of an electronic device according to various embodiments.

Hereinafter, an alarm output method of an electronic device according to various embodiments will be described in detail with reference to FIG. 6.

According to various embodiments, in operation 610, the electronic device 101 (e.g., the processor 120) may detect a connection with the locking device 300. The electronic device 101 (e.g., the processor 120) may detect an electrical connection based on the physical coupling of the connection terminal 312 of the electronic device 100 and the connection terminal 322 provided at one end of the locking device 300. According to an embodiment, when the connection with the locking device 300 is detected, the electronic device 101 (e.g., the processor 120) may perform an operation based on on-the-go (OTG), and the locking device 300 may be operated in a sink mode. The operation based on the OTG may include at least one operation for operating the electronic device 101 as a host based on the connection with the locking device 300 and operating the locking device 300 as a device. The sink mode may include the mode in which the locking device 300 is capable of performing an operation (e.g., an operation for transmitting an identifier) based on power supplied from the electronic device 101.

According to various embodiments, in operation 612, the electronic device 101 (e.g., the processor 120) may receive the identifier of the locking device 300. According to an embodiment, the electronic device 101 may perform an OTG-based operation, and the locking device 300 may be operated in a sink mode. When the electronic device 101 (e.g., the processor 120) supplies power to the locking device 300, the electronic device 101 may receive a unique identifier of the locking device 300 from the locking device 300. According to an embodiment, the electronic device 101 (e.g., the processor 120) may receive the identifier of the locking device 300 transmitted by the locking device 300 via the CC pin in the USB type C of the connection terminal 312.

According to various embodiments, in operation 614, the electronic device 101 (e.g., the processor 120) may set a locking device recognition and alarm mode. According to an embodiment, the electronic device 101 (e.g., the processor 120) may identify the identifier received from the locking device 300 so as to set the electronic device 101 to an alarm mode. The alarm mode is a mode in which, when the physical connection between the electronic device 101 and the locking device 300 is forcibly released, it is recognized that a theft is occurring and an alarm (e.g., an alarm sound and/or an alarm message) is output.

According to various embodiments, in operation 616, the electronic device 101 (e.g., the processor 120) may detect disconnection from the locking device. According to an embodiment, the electronic device 101 (e.g., the processor 120) may continuously detect whether a bias voltage level received via the CC pin of the USB type C of the electronic device 101 is changed in the state of being connected to the locking device 300. According to an embodiment, the processor 120 may detect the bias voltage applied across the CC pin of the connection terminal 312 and the GND while the connection with the second connection terminal 322 of the locking device 300 is maintained via the connection terminal 312. The processor 120 of the electronic device 101 may recognize that the connection with the locking device 300 is maintained when the detected bias voltage is within a predetermined voltage range (e.g., 0.25V to 0.61V). According to another embodiment, the processor 120 of the electronic device 101 may recognize that the connection with the locking device 300 is released when the detected bias voltage is not included within the predetermined voltage range (e.g., 0.25V to 0.61V). For example, when the bias voltage level is changed, the processor 120 of the electronic device 101 may recognize that the connection with the locking device 300 is released. According to an embodiment, in the state in which power supplied via the locking device 300 in the state in which the locking device 300 is connected with the charger 330 is charged to the battery 189 of the electronic device 101 by the locking device, when the connection between the first connection terminal 321 of the locking device 300 and the charger 330 is released and thus power is not supplied, or the cable 320 of the locking device 330 is cut and thus the bias voltage level is changed, the electronic device 101 (e.g., the processor 120) may determine that the connection with the locking device 300 is released.

According to various embodiments, in operation 618, the electronic device 101 (e.g., the processor 120) may output an alarm. According to an embodiment, when it is recognized that the connection with the locking device 300 is released, the processor 120 of the electronic device 101 may output an alarm (e.g., an alarm sound and/or an alarm message) indicating theft. According to an embodiment, when it is determined that the bias voltage level is changed, the processor 120 of the electronic device 101 may output an alarm (e.g., an alarm sound and/or an alarm message) indicating theft. According to an embodiment, the electronic device 101 (e.g., the processor 120) may output the alarm for a predetermined time, and when an input for releasing the output alarm is received within the predetermined time, the electronic device 101 may stop outputting the alarm. For example, the processor 120 of the electronic device 101 may switch the electronic device to a locking mode when the input for releasing the alarm is not input for the predetermined time. For example, when an input for releasing the alarm is not input for the predetermined time (e.g., 30 seconds), the electronic device 101 may be switched to the locking mode in which at least one function or operation that can be provided by the electronic device 101 cannot be executed.

According to various embodiments, an alarm output method of an electronic device 101 may include: an operation of detecting a connection with a locking device 300 via a connection terminal 312; an operation of receiving an identifier of the locking device 300 from the locking device 300; an operation of identifying the received identifier and setting the electronic device 101 to an alarm mode; an operation of detecting a disconnection between the electronic device 101 and the locking device 300; and an operation of outputting an alarm in response to the detected disconnection.

According to an embodiment, the method may further include an operation of performing an operation based on the on-the-go (OTG) and determine the electronic device 101 to be a host based on the connection with the locking device 300 being detected.

According to an embodiment, the method may further include an operation of providing power to the locking device 300 to operate the locking device 300 based on the electronic device 101 being determined to be the host.

According to an embodiment, the method may further include an operation of stopping output of the alarm based on an input for releasing the alarm being received in the state in which the alarm is being output.

According to an embodiment, the method may further include an operation of switching the electronic device 101 to a locking mode based on an input for releasing the alarm being not received for a predetermined time.

According to an embodiment, the method may further include an operation of detecting a change in a bias voltage level received via a configuration channel (CC) pin of USB type C of the electronic device and an operation of outputting the alarm based on the change in the bias voltage level.

According to an embodiment, the method may further include an operation of charging power, supplied via the locking device 300, to the battery 189 of the electronic device 101 in the state in which the locking device 300 is connected with a charger 330 and an operation of outputting the alarm based on the power being not supplied.

Figure 7:
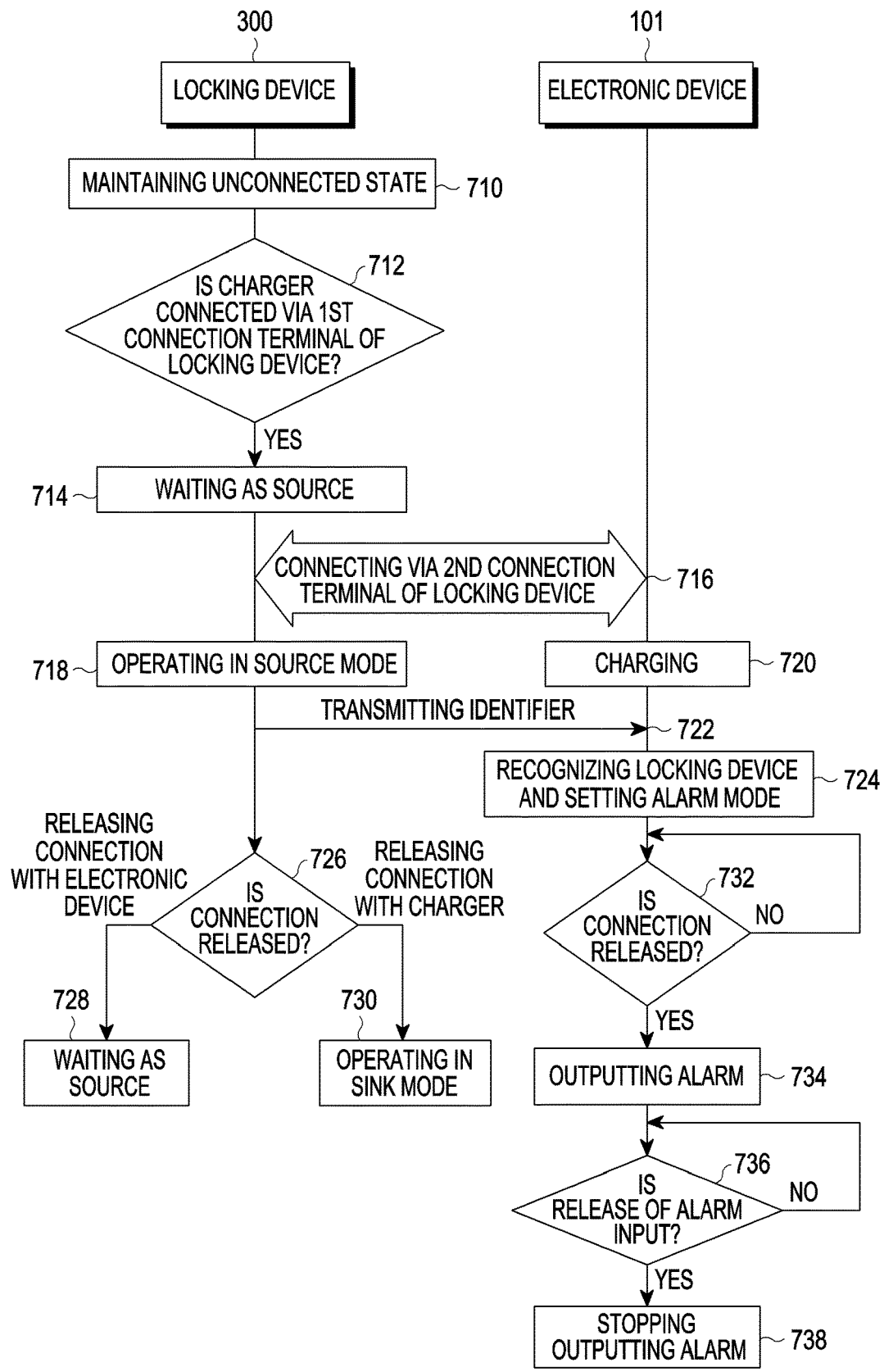
FIG. 7 is a flowchart illustrating an alarm output method of an electronic device in a system including an electronic device and a locking device according to an embodiment.

FIG. 7 is a flowchart illustrating an alarm output method of an electronic device in a system including an electronic device and a locking device according to an embodiment.

Hereinafter, an alarm output method of an electronic device in a system including an electronic device and a locking device according to various embodiments will be described in detail with reference to FIG. 7. According to various embodiments, in the state in which the locking device 300 is connected to the charger 330 via the first connection terminal 321, when the electronic device 101 is connected to the second connection terminal 322 of the locking device 300 via the connection terminal 312 of the electronic device 101 and then the locking device 300 is released from the connection with the charger 330 or the electronic device 101 is released from the connection with the locking device 300, the electronic device 101 may output an alarm.

According to various embodiments, in operation 710, the locking device 300 may be maintained in an unconnected state (e.g., a physically disconnected state) with the charger 330 and the electronic device 101. According to an embodiment, when the locking device 300 is not connected to the charger 330 via the first connection terminal 321 and is not connected to the electronic device 101 via the second connection terminal 322, the locking device may remain unconnected. The unconnected state is the sink mode in which the locking device 300 is not physically connected to the charger 330 via the first connection terminal 321 and is not physically connected to the electronic device 101 via the second connection terminal 322, and may include a power-down mode.

According to various embodiments, in operation 712, the locking device 300 may detect a connection with the charger 330 via the first connection terminal 321 of the locking device 300. According to an embodiment, the first connection terminal 321 of the locking device 300 may be physically connected to the connection terminal 331 of the charger 330. The locking device 300 may detect that the first connection terminal 321 of the locking device 300 is physically connected to the connection terminal 331 of the charger 330.

According to various embodiments, in operation 714, the locking device 300 may wait as a source. According to an embodiment, when the locking device 300 is connected to the charger 330, it may wait as a source. According to an embodiment, when physically connected to the first connection terminal 321 of the locking device 300 and the connection terminal 331 of the charger 330, the locking device 300 may wait as a source.

According to various embodiments, in operation 716, the locking device 300 and the electronic device 101 may be connected to each other. The locking device 300 may be connected to the electronic device 101 via the second connection terminal of the locking device 300, having the USB type C interface. According to an embodiment, the locking device 300 may detect that the second connection terminal of the locking device 300 and the connection terminal 312 of the electronic device 101 are physically connected to each other. According to an embodiment, the electronic device 101 (e.g., the processor 120) may detect an electrical connection based on the physical coupling of the connection terminal 312 of the electronic device 101 and the second connection terminal 322 provided at one end of the locking device 300.

According to various embodiments, in operation 718, the locking device 300 may operate in a source mode. According to an embodiment, when the locking device 300 is connected to the electronic device 101 via the second connection terminal 322 in the state of being connected to the charger 330 via the first connection terminal 321, the locking device 300 may operate in a source mode. When the locking device 300 is connected to the electronic device 101 via the second connection terminal 322 in the state of being connected to the charger 330 via the first connection terminal 321, the locking device 300 may operate in a source mode for providing the power, supplied from the charger 330, to the electronic device 101. According to an embodiment, in the state in which the locking device 300 is connected to the charger 330 via the first connection terminal 321 of the locking device 300, when the connection terminal 312 of the electronic device 101 and the second connection terminal 322 of the locking device 300 are connected to each other, the electronic device 101 may receive power supplied from the charger 330 via the locking device 300.

According to various embodiments, in operation 720, the electronic device 101 (e.g., the processor 120) may receive power supplied from the charger 330 via the locking device 300, and may charge the received power to the battery 189.

According to various embodiments, in operation 722, the locking device 300 may transmit the identifier thereof to the electronic device 101. According to an embodiment, when connected with the electronic device 101, the locking device 300 (e.g., the PD IC 440) may deliver the identifier thereof to the electronic device 101 via the CC pin of the second connection terminal 322. The electronic device 101 (e.g., the processor 120) may receive the identifier transmitted by the locking device 300 (e.g., the PD IC 440) via the CC pin of the connection terminal 322 of the electronic device 101.

According to various embodiments, in operation 724, the electronic device 101 (e.g., the processor 120) may recognize the locking device, and may set an alarm mode. According to an embodiment, when the identifier of the locking device 300 transmitted by the electronic device (e.g., the PD IC 440) is received via the CC pin of the connection terminal 322 of the electronic device 101, the electronic device 101 (e.g., the processor 120) may recognize the locking device 300 by comparing the received identifier with an identifier previously stored in the memory 130. According to an embodiment, when the received identifier is the same as the identifier previously stored in the memory 130, the electronic device 101 (e.g., the processor 120) may set (or enter) an alarm mode. The alarm mode may include a function capable of outputting an alarm (e.g., an alarm sound and/or an alarm message) by recognizing that a theft is occurring when the physical connection between the electronic device 101 and the locking device 300 is forcibly released.

According to various embodiments, in operation 726, the locking device 300 may detect that the connection with at least one of the charger 330 or the electronic device 101 is released.

According to various embodiments, in operation 728, when the connection with the electronic device 101 is released, the locking device 300 may wait as a source. According to an embodiment, when the connection with the electronic device 101 is released in the state in which the first connection terminal 321 of the locking device 300 and the connection terminal 331 of the charger 330 are physically connected to each other, the locking device may wait as a source.

Figure 8:
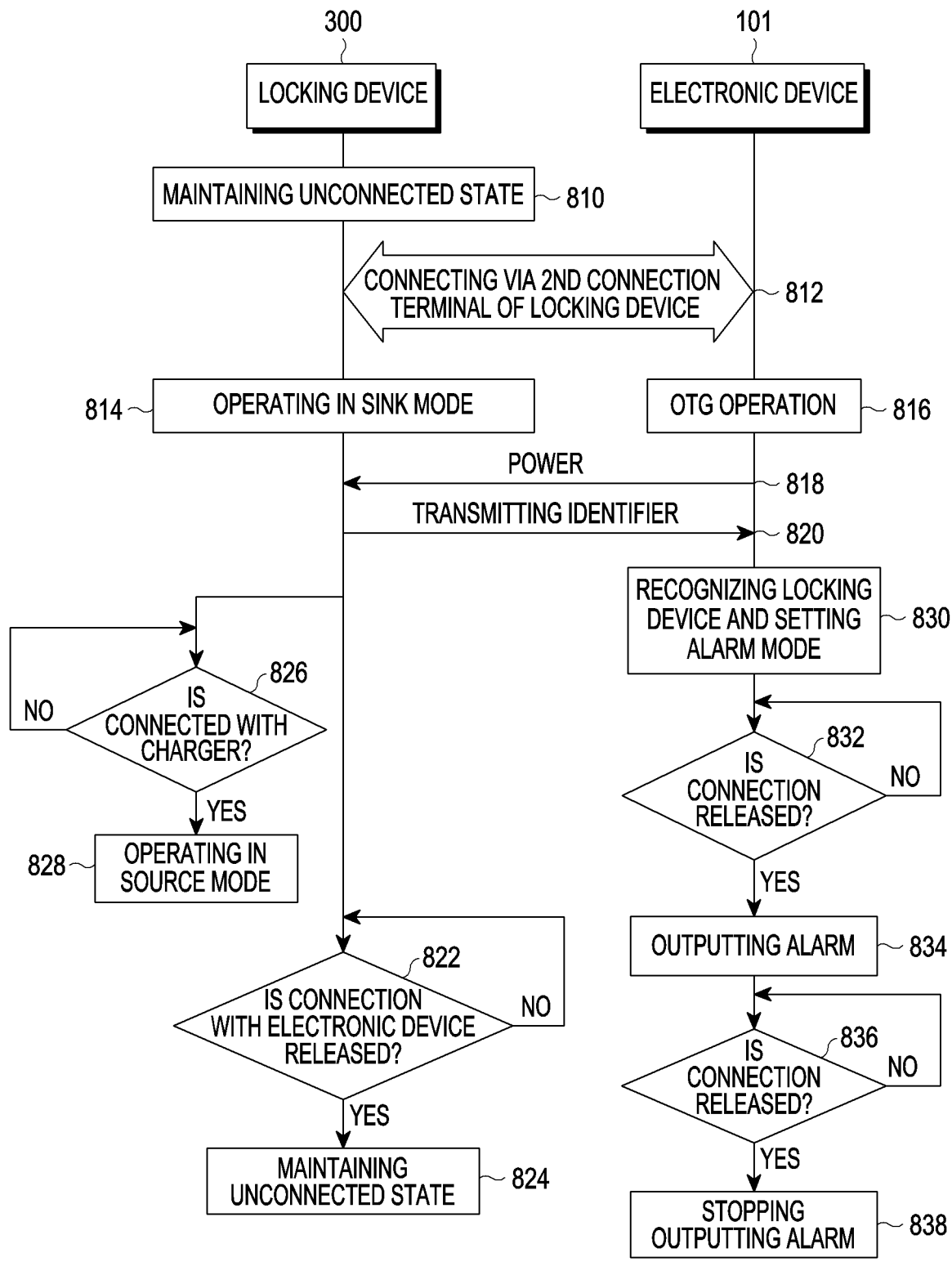
FIG. 8 is a flowchart illustrating an alarm output method of an electronic device in a system including an electronic device and a locking device according to another embodiment.

According to various embodiments, in operation 730, when the connection with the charger 330 is released, the locking device 300 may operate in a sink mode. According to an embodiment, when the connection with the charger 330 is released in the state in which the second connection terminal 322 of the locking device 300 and the connection terminal 312 of the charger 101 are physically connected to each other, the locking device may operate in a sink mode. The sink mode may include a mode in which the locking device 300 is capable of performing an operation (e.g., an operation for transmitting an identifier) based on the power supplied from the electronic device 101. According to an embodiment, the locking device 300 operates in a sink mode based on the disconnection from the charger 330, and may receive power supplied from the electronic device 101 as illustrated in FIG. 8 (e.g., operation 818 in FIG. 8). According to an embodiment, after receiving the power supplied from the electronic device 101, the locking device 300 may transmit the identifier thereof to the electronic device 101. According to an embodiment, after operating in the sink mode based on the disconnection from the charger 330, the locking device 300 may perform at least one of operations 818, 820, 822, 824, 826, and 828 thereof illustrated in FIG. 8.

According to various embodiments, in operation 732, the electronic device 101 (e.g., the processor 120) may detect that the connection with the locking device 300 is released. According to an embodiment, the electronic device 101 (e.g., the processor 120) may continuously detect whether a bias voltage level received via the CC pin of USB type C of the electronic device 101 is changed in the state of being connected to the locking device 300. For example, when the bias voltage level is changed, the processor 120 of the electronic device 101 may determine that the connection with the locking device 300 is released. According to an embodiment, in the state in which power supplied via the locking device 300 in the state in which the locking device 300 is connected with the charger 330 is charged to the battery 189 of the electronic device 101 by the locking device, when the physical connection between the second connection terminal 322 of the locking device 300 and the connection terminal 312 of the electronic device 101 is released and thus power is not supplied, or when the cable 320 of the locking device 330 is cut and thus the bias voltage level is changed, the electronic device 101 (e.g., the processor 120) may determine that the connection with the locking device 300 is released.

According to various embodiments, in operation 734, the electronic device 101 (e.g., the processor 120) may output an alarm. According to an embodiment, when it is recognized that the connection with the locking device 300 is released, the electronic device 101 (e.g., the processor 120) may output an alarm (e.g., an alarm sound and/or an alarm message) indicating theft. According to an embodiment, when it is determined that the bias voltage level is changed, the electronic device 101 (e.g., the processor 120) may output an alarm (e.g., an alarm sound and/or an alarm message) indicating theft. According to an embodiment, in the state in which the power supplied through the locking device 300 is being charged to the battery 189 of the electronic device 101, when the locking device 300 is connected to the charger 330 but power is not supplied, the electronic device 101 (e.g., the processor 120) may not output an alarm.

According to various embodiments, in operation 736, the electronic device 101 (e.g., the processor 120) may receive an input for releasing the alarm. According to an embodiment, in the state of outputting the alarm, the electronic device 101 (e.g., the processor 120) may receive an input for releasing the output alarm within the predetermined time.

According to various embodiments, in operation 738, the electronic device 101 (e.g., the processor 120) may stop outputting the alarm. According to an embodiment, in the state of outputting the alarm, when the input for releasing the output alarm is received within the predetermined time, the electronic device 101 (e.g., the processor 120) may stop outputting the alarm. For example, the electronic device 101 (e.g., the processor 120) may switch the electronic device to a locking mode when the input for releasing the alarm is not input for the predetermined time. For example, when an input for releasing the alarm is not input for the predetermined time (e.g., 30 seconds), the electronic device 101 may be switched to the locking mode in which at least one function or operation that can be provided by the electronic device 101 cannot be executed.

FIG. 8 is a flowchart illustrating an alarm output method of an electronic device in a system including an electronic device and a locking device according to another embodiment.

Hereinafter, an alarm output method of an electronic device in a system including an electronic device and a locking device according to various embodiments will be described in detail with reference to FIG. 8. According to various embodiments, when the connection with the locking device 300 is released after connected with the second connection terminal 322 of the locking device 300 via the connection terminal 312, the electronic device 101 may output an alarm.

According to various embodiments, in operation 810, the locking device 300 may be maintained in an unconnected state with the charger 330 and the electronic device 101. According to an embodiment, when the locking device 300 is not connected to the charger 330 via the first connection terminal 321 and is not connected to the electronic device 101 via the second connection terminal 322, the locking device may remain unconnected. The unconnected state is the sink mode in which the locking device 300 is not physically connected to the charger 330 via the first connection terminal 321 and is not physically connected to the electronic device 101 via the second connection terminal 322, and may include a power-down mode.

According to various embodiments, in operation 812, the locking device 300 and the electronic device 101 may be connected to each other. The locking device 300 may be connected to the electronic device 101 via the second connection terminal of the locking device 300, having the USB type C interface. According to an embodiment, the locking device 300 may detect that the second connection terminal of the locking device 300 and the connection terminal 312 of the electronic device 101 are physically connected to each other. According to an embodiment, the electronic device 101 (e.g., the processor 120) may detect an electrical connection based on the physical coupling of the connection terminal 312 of the electronic device 101 and the second connection terminal 322 provided at one end of the locking device 300.

According to various embodiments, in operation 814, the locking device 300 may operate in a sink mode. The locking device 300 may operate in the sink mode when connected with the electronic device 101. According to an embodiment, when the second connection terminal 322 of the locking device 300 and the connection terminal 312 of the electronic device 101 are physically connected to each other, the locking device 300 may operate in the sink mode. The sink mode may include the mode in which the locking device 300 is capable of performing an operation (e.g., an operation for transmitting an identifier) based on power supplied from the electronic device 101.

According to various embodiments, in operation 816, the electronic device 101 (e.g., the processor 120) may perform an OGT-based operation. According to various embodiments, when a connection with the locking device 300 is detected, the electronic device 101 (e.g., the processor 120) may determine the electronic device 101 to be a host and may perform the OTG-based operation. The operation based on the OTG may include at least one operation for operating the electronic device 101 as a host based on the connection with the locking device 300 and operating the locking device 300 as a device.

According to various embodiments, in operation 818, the electronic device 101 (e.g., the processor 120) may supply power to the locking device 300. According to an embodiment, when performing the OGT-based operation, the electronic device 101 (e.g., the processor 120) may supply power to the locking device 300 in order to receive the identifier of the locking device 300 from the locking device 300. Based on the power received from the electronic device 101, the locking device 300 (e.g., PD IC 400) may be controlled to perform an operation for transmitting the identifier thereof to the electronic device 101.

According to various embodiments, in operation 820, the locking device 300 may transmit the identifier thereof to the electronic device 101. According to an embodiment, the locking device 300 (e.g., the PD IC 440) may deliver the identifier thereof to the electronic device 101 via the CC pin of the second connection terminal 322 based on the power received from the electronic device 101. The electronic device 101 (e.g., the processor 120) may receive the identifier transmitted by the locking device 300 (e.g., the PD IC 440) via the CC pin of the connection terminal 322 of the electronic device 101.

According to various embodiments, in operation 822, the locking device 300 is released from the connection with the electronic device 101. According to an embodiment, after transmitting the identifier thereof, the locking device 300 may be released from the connection with the electronic device 101.

According to various embodiments, in operation 824, the locking device 300 may be maintained in an unconnected state. According to an embodiment, when the connection with the electronic device 101 is released, the locking device 300 may be maintained in the unconnected state. According to an embodiment, when the connection with the electronic device 101 is released, the locking device 300 may be maintained in the unconnected state, as in operation 810.

According to various embodiments, in operation 826, the locking device 300 may be connected to the charger 330. According to an embodiment, in the state of being physically connected with the connection terminal 312 of the electronic device 101 via the second connection terminal 322 of the locking device 300, the locking device 300 may be physically connected with the connection terminal 331 of the charger 330 via the first terminal 321 thereof.

According to various embodiments, in operation 828, the locking device 300 may operate in a source mode. According to an embodiment, when connected with the charger 330 via the first connection terminal 321 of the locking device 300 in the state of being physically connected with the connection terminal 312 of the electronic device 101 via the second connection terminal 322 of the locking device 300, the locking device 300 may operate in the source mode. When connected to the electronic device 101 via the second connection terminal 322 in the state of being connected with the connection terminal 312 of the electronic device 101, the locking device 300 may operate in the source mode for providing the power, supplied from the charger 330, to the electronic device 101. According to an embodiment, the locking device 300 may operate in the sink mode based on the connection with the charger 330, and may transmit the identifier thereof to the locking device 300 as illustrated in FIG. 7 (e.g., operation 722 in FIG. 7). According to an embodiment, after receiving the power supplied from the electronic device 101, the locking device 300 may transmit the identifier thereof to the electronic device 101. According to an embodiment, after operating in the sink mode based on the connection with the charger 330, the locking device 300 may perform at least one of operations 726, 728, and 730 thereof illustrated in FIG. 8. According to an embodiment, in the state in which the locking device 300 is connected to the electronic device 101 via the second connection terminal 322 of the locking device 300, when the connection terminal 312 of the electronic device 101 and the second connection terminal 322 of the locking device 300 are connected to each other, the electronic device 101 may receive power supplied from the charger 330 via the locking device 300.

According to various embodiments, in operation 830, the electronic device 101 (e.g., the processor 120) may recognize the locking device, and may set an alarm mode. According to an embodiment, when the identifier of the locking device 300 transmitted by the locking device 300 (e.g., the PD IC 440) is received via the CC pin of the connection terminal 322 of the electronic device 101, the electronic device 101 (e.g., the processor 120) may recognize the locking device 300 by comparing the received identifier with an identifier previously stored in the memory 130. According to an embodiment, when the received identifier is the same as the identifier previously stored in the memory 130, the electronic device 101 (e.g., the processor 120) may set (or enter) an alarm mode. The alarm mode may include a function capable of outputting an alarm (e.g., an alarm sound and/or an alarm message) by recognizing that a theft is occurring when the physical connection between the electronic device 101 and the locking device 300 is forcibly released.

According to various embodiments, in operation 832, the electronic device 101 (e.g., the processor 120) may detect that the connection with the locking device 300 is released. According to an embodiment, the electronic device 101 (e.g., the processor 120) may continuously detect whether a bias voltage level, received via the CC pin of the USB type C of the electronic device 101, is changed in the state of being connected to the locking device 300. For example, when the bias voltage level is changed, the processor 120 of the electronic device 101 may determine that the connection with the locking device 300 is released. According to an embodiment, when the locking device 300 is connected with the charger 330, the electronic device 101 (e.g., the processor 120) may charge the power, supplied via the locking device 300, to the battery 189 of the electronic device 101. In the state in which power is charged to the battery 189, when the physical connection between the second connection terminal 322 of the locking device 300 and the connection terminal 312 of the electronic device 101 is released and thus power is not supplied, the electronic device 101 (e.g., the processor 120) may determine that the connection with the locking device 300 is released.

According to various embodiments, in operation 834, the electronic device 101 (e.g., the processor 120) may output an alarm when the connection with the locking device 300 is released. According to an embodiment, when it is recognized that the connection with the locking device 300 is released, the electronic device 101 (e.g., the processor 120) may output an alarm (e.g., an alarm sound and/or an alarm message) indicating theft. According to an embodiment, when it is determined that the bias voltage level is changed, the electronic device 101 (e.g., the processor 120) may output an alarm (e.g., an alarm sound and/or an alarm message) indicating theft. According to another embodiment, in the state in which the power supplied through the locking device 300 is being charged to the battery 189 of the electronic device 101, when the locking device 300 is connected to the charger 330 but the power is not supplied, the electronic device 101 (e.g., the processor 120) may not output an alarm.

According to various embodiments, in operation 836, the electronic device 101 (e.g., the processor 120) may receive an input for releasing the alarm. According to an embodiment, in the state of outputting the alarm, the electronic device 101 (e.g., the processor 120) may receive an input for releasing the output alarm within the predetermined time.

According to various embodiments, in operation 838, the electronic device 101 (e.g., the processor 120) may stop outputting the alarm. According to an embodiment, in the state of outputting the alarm, when the input for releasing the output alarm is received within the predetermined time, the electronic device 101 (e.g., the processor 120) may stop outputting the alarm. For example, the electronic device 101 (e.g., the processor 120) may switch the electronic device to a locking mode when the input for releasing the alarm is not input for the predetermined time. For example, when an input for releasing the alarm is not input for the predetermined time (e.g., 30 seconds), the electronic device 101 may be switched to the locking mode in which at least one function or operation that can be provided by the electronic device 101 cannot be executed.

What is claimed is:

1. An electronic device comprising:
   a connection terminal; and
   a processor,
   wherein the processor is configured to:
      detect a connection with a locking device via the connection terminal;
      receive an identifier of the locking device from the locking device;
      identify the received identifier and set the electronic device to an alarm mode;
      detect a disconnection between the electronic device and the locking device; and
      output an alarm in response to the detected disconnection,
   wherein the connection terminal includes a USB type C, and the identifier is received via a configuration channel (CC) pin of the USB type C,
   wherein the processor is further configured to:
      output the alarm based on a change in a bias voltage level received via the CC pin of the USB type C.

2. The electronic device of claim 1, wherein the processor is configured to:
   determine the electronic device to be a host, based on the connection with the locking device being detected.

3. The electronic device of claim 2, wherein the processor is configured to:
   provide power to the locking device to operate the locking device based on the electronic device being determined to be the host.

4. The electronic device of claim 1, wherein the processor is configured to:
   stop outputting the alarm based on an input for releasing the alarm being received in a state in which the alarm is being output.

5. The electronic device of claim 1, wherein the processor is configured to:
   switch the electronic device to a locking mode based on an input for releasing the alarm being not received for a predetermined time.

6. The electronic device of claim 1, further comprising a battery,
   wherein the processor is configured to:
   charge power, supplied via the locking device, to the battery in a state in which the locking device is connected with a charger; and
   output the alarm based on the power being not supplied.

7. An alarm output method of an electronic device, the method comprising:
   detecting a connection with a locking device via a connection terminal including a USB type C;
   receiving an identifier of the locking device from the locking device via a configuration channel (CC) pin of the USB type C;
   identifying the received identifier and setting the electronic device to an alarm mode;
   detecting a disconnection between the electronic device and the locking device;
   outputting an alarm in response to the detected disconnection;
   detecting a change in a bias voltage level received via the configuration channel (CC) pin of the USB type C of the electronic device; and
   outputting the alarm based on the change in the bias voltage level.

8. The method of claim 7, further comprising:
   determining the electronic device to be a host based on the connection with the locking device being detected.

9. The method of claim 8, further comprising:
   providing power to the locking device to operate the locking device based on the electronic device being determined to be the host.

10. The method of claim 7, further comprising:
    stopping the outputting of the alarm based on an input for releasing the alarm being received in a state in which the alarm is being output.

11. The method of claim 7, further comprising:
    switching the electronic device to a locking mode based on an input for releasing the alarm being not received for a predetermined time.

12. The method of claim 7, further comprising:
    charging power, supplied via the locking device, to a battery of the electronic device in a state in which the locking device is connected with a charger; and
    outputting the alarm based on the power being not supplied.

* * * * *